A. W. KENT.
SIDEWALK AND ROOF CONSTRUCTION.
APPLICATION FILED AUG. 8, 1917.
1,283,208.
Patented Oct. 29, 1918.
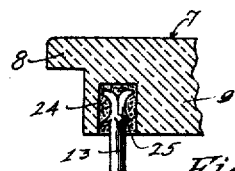
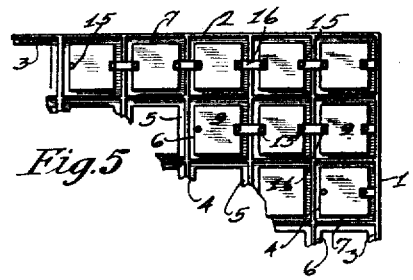
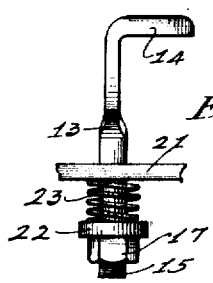
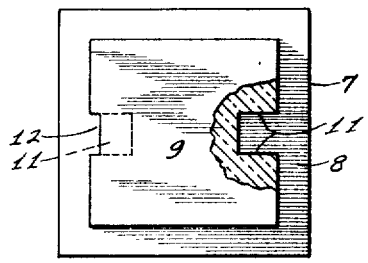
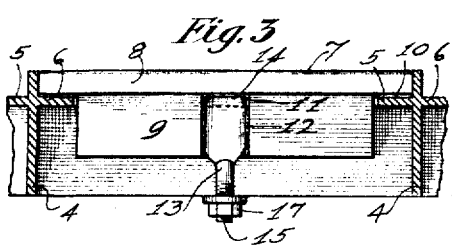
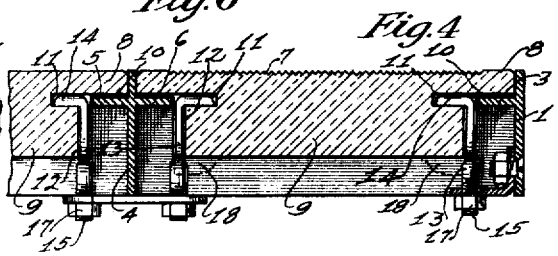
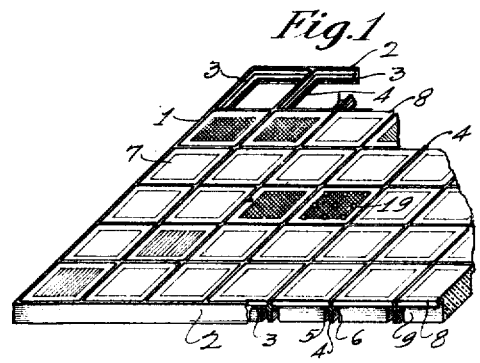
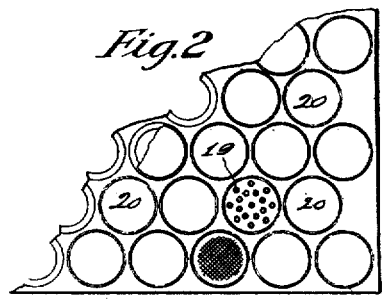
Witnesses
R. O. Albright
W. F. Elwin
INVENTOR,
Alexander W. Kent,
By Arthur L. Nash
Attorney

UNITED STATES PATENT OFFICE.

ALEXANDER W. KENT, OF LOS ANGELES, CALIFORNIA.

SIDEWALK AND ROOF CONSTRUCTION.

1,283,208.  Specification of Letters Patent.  Patented Oct. 29, 1918.

Application filed August 8, 1917. Serial No. 186,083.

*To all whom it may concern:*

Be it known that I, ALEXANDER W. KENT, a citizen of the United States, residing at Los Angeles, in the county of Los Angeles and State of California, have invented certain new and useful Improvements in Sidewalk and Roof Constructions, of which the following is a specification.

My invention relates to transparent sidewalk and roof structures which are employed for providing light for cellars beneath the sidewalks, or in the roofs of buildings and the primary object is to provide a structure having a rigid metal frame for holding a plurality of glass prisms of rectangular or circular form in position, and means for individually supporting the glasses so as to permit their ready insertion in and removal from their positions in the frame in the event of their being broken.

A further object is to provide resilient retention means for supporting the glasses removably in the frame so as to cushion the same against impact or jar, together with means between the glasses and frame for rendering the structure water tight. Other objects will appear as the description progresses.

I attain the objects above set forth by means of the structure illustrated in the accompanying drawings, in which Figure 1 is a perspective view of a portion of a sidewalk structure showing a rectangular form of glass. Fig. 2 is a fragmentary plan of a structure having circular glasses supported therein. Fig. 3 is a fragmentary section of the frame showing a single glass and the supporting means therefor in position in the frame. Fig. 4 is a similar view of the frame at right angles to Fig. 3 and showing the glasses in section. Fig. 5 is a bottom plan of the structure shown in Fig. 1. Fig. 6 is an enlarged bottom plan of one of the lights partly broken away. Fig. 7 is an elevation of one of the glass supports, and Fig. 8 is a section showing a modified means for attaching the supports to the glasses.

Referring to the drawings, in which similar characters of reference are employed for indicating the same or like parts, and in which a preferred method of construction is shown, the frame for supporting the glass lights in position consists of a plurality of regularly spaced transverse and longitudinal members of which the outer members 1 and 2, forming the outside of the frame, have inner horizontally disposed ribs 3 on the inner sides thereof, and the inner members 4 of the frame have pairs of ribs, as at 5 and 6 which are similar to and in the same plane with the ribs 3 on members 1 and 2, the foregoing being descriptive of that form of frame shown in Fig. 1.

The arrangement of the frame as described, provides in each of the frame units, of which there may be any desired number in a sidewalk or roof, a plurality of regularly spaced recesses of rectangular form with relatively deeper portions beneath than above the ribs 3, or 5 and 6. The lights 7 have flanged top portions 8 which conform substantially in size to the spaces between the central portions of the frame members and lower portions 9 of greater thickness than the top portions which are slightly smaller than the spaces between the ribs 3, 5 and 6 and depend into the lower portions of the recesses in the frames, the lower surfaces of the lights being supported on these ribs and suitable cushions 10 being interposed therebetween which, in addition to providing cushions for the lights also serve to render the several spaces water tight.

The lights 7, in the plane of the junction of the tops 8 and the bottoms 9, are provided with inwardly extending recesses 11 and the sides of the bottom portions thereof have grooves 12 formed therein which communicate with the recesses 11, the grooves and recesses in each of the lights being formed at diametrically opposite points, as shown in Fig. 6, and when in position in the frame, the groove and recess on one of the lights will be adjacent to and in alinement with the groove and recess on the light next in line, as shown in Figs. 4 and 5.

The lights are held in position in the frame and may be drawn tightly against their cushions and packing 10 by means of clamps 13 which have flattened and right angularly bent ends 14 adapted to be inserted in the horizontal recesses 11 in the lights, and threaded ends 15 on their opposite extremities which are adapted to be inserted in and secured to the flat springs 16 by means of nuts 17, as shown in Fig. 4, the adjacent sides of two adjacent lights being thus held by separate clamps secured to a common spring, and the flat portions of the clamps below the bent upper ends being seated in the vertical grooves 12 of the lights, thus preventing any movement of the lights relative to the frame.

It will be understood from the above description that the lights 7 may be easily replaced in the frame when one of them for any reason may be broken, and will at all times be held in resilient contact with the frame. This construction eliminates the necessity of calking the joints between the lights with cement or other substance as usually employed in structures of this character, and yet provides a thoroughly water tight and otherwise satisfactory structure.

The tops of the lights 7 may be corrugated or ribbed as in the usual structures of this character, in order to prevent injury to pedestrians in wet weather, due to the slipping thereover, and if required, the bottom portions 9 may be reinforced, as shown by broken lines at 18 around the periphery of the grooves 12 by additional thickness of glass so that breakage may not result from constant use with the tension on the springs 16. Also, an occasional light may be provided with apertures 19 formed therein so as to afford ventilation to the space below the walk or roof. When circular lights, as at 20 in Fig. 2, are used, the frame must of necessity be of a different form, the recesses in which the lights are placed, in such case being made to conform to the shape of the lights and the top surface of the frame being extended so as to cover the spaces between the lights.

In lieu of the form of clamps shown in Figs. 3, 4 and 5, a slightly different form may be employed such as is shown in Fig. 7, in which a non-resilient strap 21 may be provided in lieu of the springs 16, through which the threaded ends of the clamps may be extended and provided with a collar 22 and a coil spring 23 held compressed between the strap 21 and the collar 22. Also, instead of the recesses 11 in the lights 7 as described and shown, circular recesses 24 may be provided therein which extend upwardly from the bottoms of the lights, and in these recesses, the upper ends of the clamps, which may be burred or cut as at 25 in Fig. 8, may be inserted and embedded firmly in a suitable compound or cement for holding the clamps rigidly in the lights. In this latter form of construction, however, it is essential that a cement or compound should be used which will have an expansion and contraction substantially equal to that of the lights, and for this reason it is undesirable that the metallic clamps should be cast integral with the lights, the difference in expansion and contraction serving to crack and break the lights.

The frames which hold the lights may be of any desired form and size and may be of either cast or wrought iron or other metal, but the cast frame is for many reasons more desirable, chiefly because a more uniform frame may be provided and less work will be required to finish and install the structure. The cushions between the lights and frame will compensate for any irregularities in the frame and may be of suitable thickness and resiliency for this purpose.

Having thus described my invention, what I claim as new and desire Letters Patent for, is:

1. A sidewalk and roof structure comprising a frame having longitudinal and transverse frame members spaced apart and forming recesses therebetween, said frame members having horizontal ribs extending into and around said recesses, a plurality of transparent elements adapted to seat on said ribs, shallow channels being formed in the edges of said transparent elements and having depressions of greater depth than said channels formed therein in communication with said channels, holding elements insertible in said channels and having ends insertible in said depressions and extended substantially below said frame, and means removably attachable to said holding elements for clamping the adjacent sides of said transparent elements to said frame.

2. In a sidewalk and roof structure, transparent elements comprising a body having a flange formed thereon at the top and a central reduced portion extended substantially below said flange, channels formed in the sides of said body portion and extending from the bottom of said flange to the bottom of said body portion, and recesses formed in and of greater depth than said channels at points adjacent to said flange, whereby said transparent elements may be held in position for use.

3. In a sidewalk and roof structure, a frame having recesses and seats formed therein, transparent blocks positioned in said recesses and having flanges engaging said seats, said blocks having channels and recesses formed in the sides thereof, holding elements insertible in the channels and recesses in said blocks, and means removably attachable to said holding elements for supporting said blocks in said frame.

4. A sidewalk structure comprising a recessed frame having a plurality of transparent elements removably held therein, recesses formed in said elements, and means insertible in said recesses and attachable to said frame for resiliently holding said elements in position.

5. A sidewalk structure comprising a skeleton frame having a plurality of transparent elements supported thereon, packing elements between said frame and said transparent elements, and resilient clamping means for removably holding said transparent elements in position, said clamping means being seated in channels formed in the side of said transparent elements and having extensions seated in depressions in said channels.

6. A sidewalk structure comprising a recessed frame with horizontal ribs surrounding the recesses therein, a transparent element seated in each of said recesses and having a flange engaging said rib and channels in the sides thereof with depressions of greater depth than the channels below said flanges, and resilient clamping means insertible in said channels and in said depressions for removably holding said elements in position on said frame.

7. A sidewalk structure comprising a plurality of recesses formed therein and horizontal ribs surrounding said recesses, a transparent element seated in each of said recesses and provided with recesses on the sides thereof, clamping members insertible in said recesses, and means for resiliently attaching said clamps to said frame for holding the transparent elements removably and resiliently in position.

8. A sidewalk structure comprising a frame having a plurality of recesses formed therein with horizontal and vertical ribs extending around said recesses, packing elements seated upon said horizontal ribs, transparent elements seated upon said packing elements, holding members insertible in said transparent elements and extending therefrom, and means removably attachable to said members for holding said transparent elements in resilient and water tight relation with said frame.

ALEXANDER W. KENT.

Witnesses:
C. O. ALBRIGHT,
LUTHER L. MACK.

Copies of this patent may be obtained for five cents each, by addressing the "Commissioner of Patents, Washington, D. C."